US010691418B1

(12) United States Patent
Ritter et al.

(10) Patent No.: US 10,691,418 B1
(45) Date of Patent: Jun. 23, 2020

(54) PROCESS MODELING ON SMALL RESOURCE CONSTRAINT DEVICES

(71) Applicant: SAP SE, Walldorf (DE)

(72) Inventors: Daniel Ritter, Heidelberg (DE); Egor Hinz, Neulußheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/253,929

(22) Filed: Jan. 22, 2019

(51) Int. Cl.
*G06F 8/20* (2018.01)
*G06F 8/34* (2018.01)
*G06F 3/0484* (2013.01)

(52) U.S. Cl.
CPC ............ *G06F 8/20* (2013.01); *G06F 3/04845* (2013.01); *G06F 8/34* (2013.01)

(58) Field of Classification Search
CPC ............ G06F 3/04842; G06F 3/04845; G06F 3/0486; G06F 8/20; G06F 8/34
USPC .................................................. 717/100–135
See application file for complete search history.

(56) References Cited

U.S. PATENT DOCUMENTS 6,987,535 B1 * 1/2006 Matsugu ............. G06F 3/04845 348/239
7,165,226 B2 * 1/2007 Thurner ................. G05B 15/02 715/767
7,430,732 B2 * 9/2008 Cwalina .................... G06F 8/20 717/126
8,839,266 B1 * 9/2014 Partridge ................ G06F 13/00 719/310
10,042,529 B2 * 8/2018 Wang .................. G06F 3/04845
2004/0017513 A1 * 1/2004 Takahashi .......... H04N 5/44513 348/552
2013/0097592 A1 * 4/2013 Simitsis ............. G06Q 10/0633 717/156
2013/0159920 A1 * 6/2013 Scott ..................... G06F 40/274 715/780
2014/0082491 A1 * 3/2014 Adachi ................. G06F 3/0488 715/702
2015/0067559 A1 * 3/2015 Missig ................ G06F 3/04845 715/765
2015/0207833 A1 * 7/2015 Tsubotani ........... G06F 3/04842 715/753
2015/0355827 A1 * 12/2015 Van Der Westhuizen .................. G06F 3/04842 715/788
2016/0042495 A1 * 2/2016 Boshoff .............. G06F 3/04812 715/767
2016/0124089 A1 * 5/2016 Meinherz ................ G01S 17/36 356/5.01

(Continued)

*Primary Examiner* — Marina Lee
(74) *Attorney, Agent, or Firm* — Sterne, Kessler, Goldstein & Fox, P.L.L.C.

(57) ABSTRACT

Disclosed herein are system, method, and computer program product embodiments for providing an integration application design tool supporting integration-scenario modeling on mobile devices. The integration application design tool determines a focus node in an integration scenario. To conserve system resources, the integration application design tool loads data associated with that focus node. The integration application design tool displays only a visible area of predecessor nodes and successor nodes based on a neighborhood value. The integration application design tool receives interaction primitives from a user to navigate the integration scenario, examine properties of the nodes, and perform appropriate operations related to the design and modification of the integration scenario.

20 Claims, 10 Drawing Sheets

600

(56) References Cited

U.S. PATENT DOCUMENTS

| | | | | |
|---|---|---|---|---|
| 2016/0147308 | A1* | 5/2016 | Gelman | H04N 9/31 345/156 |
| 2016/0259413 | A1* | 9/2016 | Anzures | G06F 3/016 |
| 2017/0329581 | A1* | 11/2017 | Jann | G06Q 10/10 |
| 2019/0279407 | A1* | 9/2019 | McHugh | G06F 3/0482 |
| 2019/0286302 | A1* | 9/2019 | Reid | G06F 3/04845 |
| 2019/0302994 | A1* | 10/2019 | Boshoff | G06F 3/04842 |

* cited by examiner

PROCESS MODELING ON SMALL RESOURCE CONSTRAINT DEVICES

BACKGROUND

An integration platform may allow an organization to design, implement, and deploy software applications and systems that harness resources from across the organization's technical landscape. Such resources may incorporate applications, services, data sources, and other capabilities regardless of the operating systems, programming languages, data types, and other differences among the resources. An integration platform may furnish functional components to facilitate the design of integration applications, retrieve and transform data, interact with various application programming interfaces (APIs), deploy integration applications to users, and otherwise assist in the management and maintenance of integration applications.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
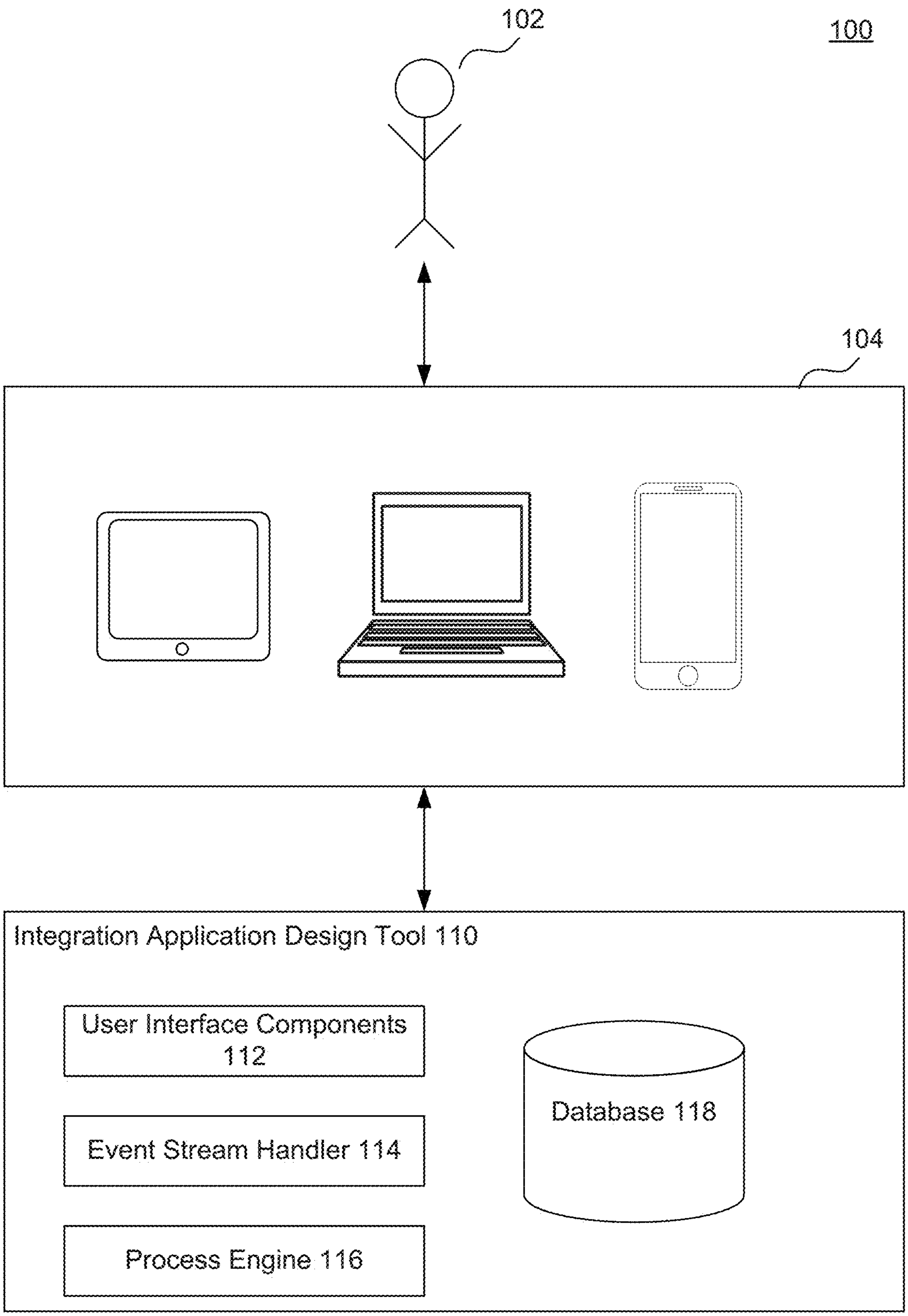
FIG. 1 is a block diagram of a cloud platform including an integration application design tool, according to some embodiments.

Provided herein are system, apparatus, device, method and/or computer program product embodiments, and/or combinations and sub-combinations thereof, for providing an integration application design tool supporting integration-scenario modeling on mobile devices.

An organization's enterprise landscape may incorporate a wide-array of applications, services, data sources, servers, and other resources. Applications in this landscape may be varied and multitudinous and include: custom-built applications, legacy applications, database applications, and enterprise-resource-planning applications, just to name a few examples. These applications and the data that the applications use may be housed in different locations and on different servers or may be accessed via the cloud.

To create useful business processes, applications, and systems that leverage these disparate systems, applications may need to interact and exchange data. An integration platform bridges this divide by centralizing communications between technical resources used by an organization. Such an integration platform may include message buses/protocols to facilitate communication between applications, data flow coordinators, connectors, security and data protection, dashboards and analysis tools, APIs, and other suitable tools.

An integration platform may implement an integration scenario design tool that developers may use to design integration applications and integration scenarios that access and manipulate an organization's various resources. The integration scenario design tool may provide developers with assets, connectors, operations, API calls, data transformations, scripting and programming languages, and other suitable programmatic constructs from which to build out an integration application. For example, a first asset in an integration scenario may connect to a user's watch and pull data about the number of steps that the user took, while a second asset enters this data into a stored database server.

An integration scenario design tool may further create a visualization of the integration scenario. In such a visualization, a developer may view in graphical form the nodes, data sources, relationships, and operations within an integration scenario. The integration scenario design tool may allow a user to update parameters and settings associated with the nodes and connections in the integration scenario, for example, by entering server information, security/account information, transport/message protocols, etc.

The integration scenario resultant from an integration scenario design tool may also be referred to as a business process, integration application, or integration flow, and may include one or more objects connected to one another via pipelines or transformational links. An object in an integration scenario may also be referred to as a node or card. Each node may perform tasks including: receiving data, calling an operation/function to perform on data, passing data on to another node or nodes, etc. Nodes in an integration scenario may communicate in several ways including: 1:1 route (one object passing data to one other object), 1:n fork (one object passing data to more than one other object), and m:1 join (two or more objects joining data to pass to one other object). In other words, a node may have zero, one, or more than one successors in the integration scenario and zero, one, or more than one predecessors in the integration scenario.

One skilled in the arts will appreciate that an integration scenario may become very large and include a great number of objects and connections between the objects. A visualization of a large integration scenario provided by the integration application design tool may become correspondingly large and unwieldy, especially when attempting to view, edit, or design the integration scenario on a device with a smaller screen size.

Traditional integration scenario design tools have proven unable to provide user experiences that translate into a satisfactory mobile design experience. For example, a mobile device may attempt to display an entire integration scenario on the smaller screen, but the scenario may be unreadable when the scenario is large and the screen is small. A mobile device may attempt to display only a portion of the integration scenario, but this may limit the context that a user may be able to view and force a user to scroll or slide the screen frequently. Performing actions, such as adding a node or a connection, may be impractical or impossible in the mobile space. Moreover, resource constraints (processor, memory, etc.) on mobile devices may prevent current modeling approaches from functioning at all in the mobile paradigm.

Accordingly, a need exists to furnish an integration scenario design tool that supports the modeling of integration scenarios and complex integration scenarios on mobile devices. The increasing ubiquity of use of smart phones, tablets, and IoT devices among users and organizations exacerbates this need.

FIG. 1 is a block diagram illustrating cloud platform 100 including an integration application design tool, according to some embodiments. Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein. Cloud platform 100 may include user 102, device 104, integration application design tool 110, user interface components 112, event stream handler 114, process engine 116, and data 118.

User 102 may be a developer or other individual designing, developing, and deploying integration applications within cloud platform 100. User 102 may be a member of a business, organization, or other suitable group. User 102 may be a human being, but user 102 may also be an artificial intelligence construct. User 102 may employ, i.e., connect to, a network or combination of networks including the Internet, a local area network (LAN), a wide area network (WAN), a wireless network, a cellular network, or various other types of networks as would be appreciated by a person of ordinary skill in the art.

Device 104 may be a personal digital assistant, desktop workstation, laptop or notebook computer, netbook, tablet, smart phone, mobile phone, smart watch or other wearable, appliance, part of the Internet-of-Things, and/or embedded system, to name a few non-limiting examples, or any combination thereof. Although device 104 is illustrated in the example of FIG. 1 as a single computer, one skilled in the art(s) will understand that device 104 may represent two or more computers in communication with one another. Therefore, it will also be appreciated that any two or more components of device 104 may similarly be executed using some or all of the two or more computers in communication with one another.

Integration application design tool 110 may allow user 102 to design integration applications that access and manipulate disparate resources used by an organization. Integration application design tool 110 may provide a graphical design environment to allow users to build, edit, and deploy integration applications. Integration application design tool 110 may provide security protocols, APIs, programming languages, and other suitable tools related to integration application development. Integration application design tool 110 may standardize access to various data sources, provide connections to third-party systems, and provide additional functionalities to further integrate data from a wide-array of internal and on-the-cloud data sources. Integration application design tool 110 may include user interface components 112, event stream handler 114, process engine 116, and data 118.

Integration application design tool 110 may include a variety of pre-built deployable assets, e.g., APIs and data sources that user 102 may deploy using, for example, a drag-and-drop interface into an integration scenario as a node. For one example of an integration scenario designed in integration application design tool 110, user 102 may build an integration scenario that synchronizes data between an enterprise resource planning (ERP) system and a customer relationship management (CRM) system. Such an integration scenario may need to handle the adding of a new customer in the CRM system by passing that information to the ERP system to ensure that the two systems stay in synchronization. In this scenario, user 102 may add a node in integration application design tool 110 that connects to the CRM system, add a second node in integration application design tool 110 that connects to the ERP system, and then add a connector from the CRM system to the ERP system. The resultant integration application may then receive a set of fields from the CRM node and pass these fields via the connection to the ERP system to add the new customer data in the appropriate format and/or through a suitable API. In this example, the integration scenario would have only two nodes scenario and one connection.

Moreover, integration application design tool 110 may incorporate context information, e.g. GPS position, gyro-position sensor data, etc. and may be integrated with other mobile applications connected to ERP and/or CRM systems. For example, an integration scenario may be programmed to provide predictive maintenance for an automobile. In this integration scenario, data received from the car may be combined with data received from a mobile device along with other context information. This example integration scenario may then interface with an ERP system to determine if the automobile needs maintenance in the form of a service request.

User interface components 112 may be employed by integration application design tool 110 to provide components used by integration application design tool 110 to render a user interface for view by user 102 via device 104. User interface components 112 may include a JavaScript user interface library to facilitate dynamic interactions between user 102 and integration application design tool 110. User interface components 112 may include a development toolkit facilitating the building of HTML5 or mobile applications. User interface components 112 may allow a business or organization to upgrade components used by integration application design tool 110 in order to change the experience for user 102 over time.

Event stream handler 114 may handle and process streams of interaction primitives (such as those described below with reference to FIGS. 5A-5H) produced by user 102 on device 104 and inputted to integration application design tool 110. Event stream handler 114 may employ an event processing component that uses an event-to-process mapping component to reduce the events. Integration application design tool 110 may modify the process model depending on the current state of an integration scenario being designed.

Process engine 116 may interact with resources used by an integration application designed in integration application design tool 110. Process engine 116 may introduce newly defined capabilities into the message processing employed by integration application design tool 110. Process engine 116 may consume external data applications and data sources. Process engine 116 may observe changes in the data on these external data applications from context services.

Data 118 may be any of a panoply of data storage systems housing information relevant to, used in, and stored by integration application design tool 110 including information about designed integration scenarios, available assets for deployment, connections, etc. For instance, data 118 may be a database management system or relational database tool. Data 118 may further be a message queue or stream processing platform such as Apache Kafka or Apache Spark or other data storage systems like Apache Hadoop, HDFS, or Amazon S3, to name just some examples. Data 118 may be a data lake, data silo, semi-structured data system (CSV, logs, xml, etc.), unstructured data system, binary data repository, or other suitable repository. Data 118 may store thousands, millions, billions, or trillions (or more) of objects, rows, transactions, records, files, logs, etc. while allowing for the creation, modification, retrieval, archival, and management of this data. In an embodiment, data 118 uses scalable, distributed computing to efficiently catalog, sort, manipulate, and access stored data.

Figure 2:
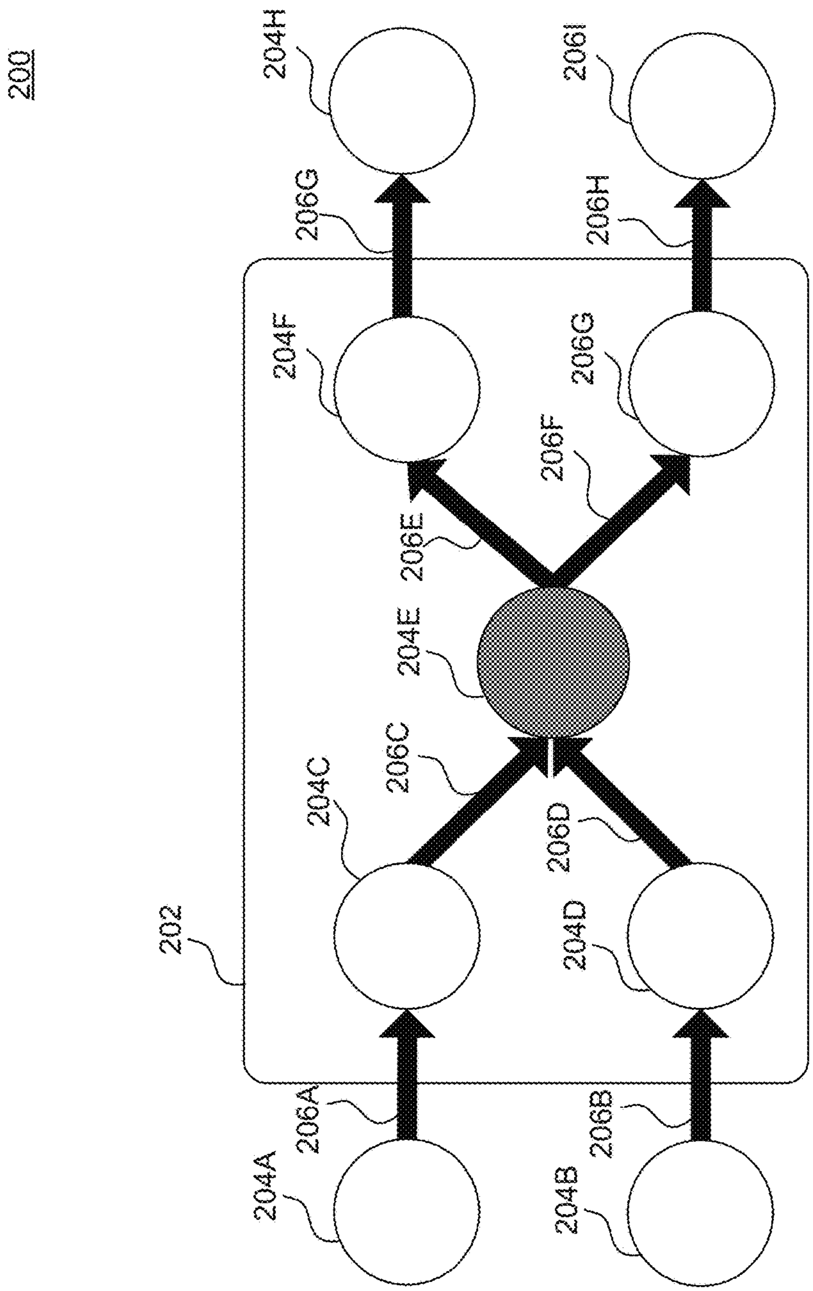
FIG. 2 is an example integration scenario, according to some embodiments.

FIG. 2 is an example integration scenario 200, according to some embodiments. Integration scenario 200 is merely exemplary, and one skilled in the relevant art(s) will appreciate that a multitude of integration applications may exist in accordance with this disclosure. Integration scenario 200 may include limited area 202, node 204, and connection 206. The exemplary integration scenario 200 in FIG. 2 includes nine examples of node 204 and eight examples of connection 206.

Limited area 202 may display a portion or subset of integration scenario 200. In this exemplary instance, limited area 202 includes five nodes and four connections between the nodes. Limited area 202 will be described in further detail below with reference to FIG. 3.

Node 204 may be an API, data source or other asset included in integration scenario 200 that performs tasks including receiving data, calling an operation/function to perform on data, passing data on to another object or objects, and other capabilities. Node 204 may pull data from a number of data sources, such as a suitable data repository, either in a raw form or following (or at an intermediate step within) the application of a transformational capability. Such data sources may include data lakes, data silos, message streams, relational databases, semi-structured data (CSV, logs, xml, etc.), unstructured data, binary data (images, audio, video, etc.), or other suitable data types in appropriate repositories, both on-premises and on the cloud. Just for example, node 204 may provide data or functionalities by connecting to a CRM system, an ERP system, a database, an internet-Of-Things device, a mobile phone, a watch, a JIRA tasklist, a revision control system or other code management tool, and/or a multitude of other sources.

Connection 206 may be a pipeline, message channel, or other suitable connection between nodes in integration scenario 200. Connection 206 may transmit data using any suitable transfer protocol, communication protocol, or other information-interchange mechanism. Connection 206 may provide a way to connect different, concurrent operations, functions, data sources, and data repositories. In some embodiments, connection 206 may perform additional transformational operations, for example, by providing a scripting language or other programmatic construct with which to further manipulate data passing through the connection.

Figure 3:
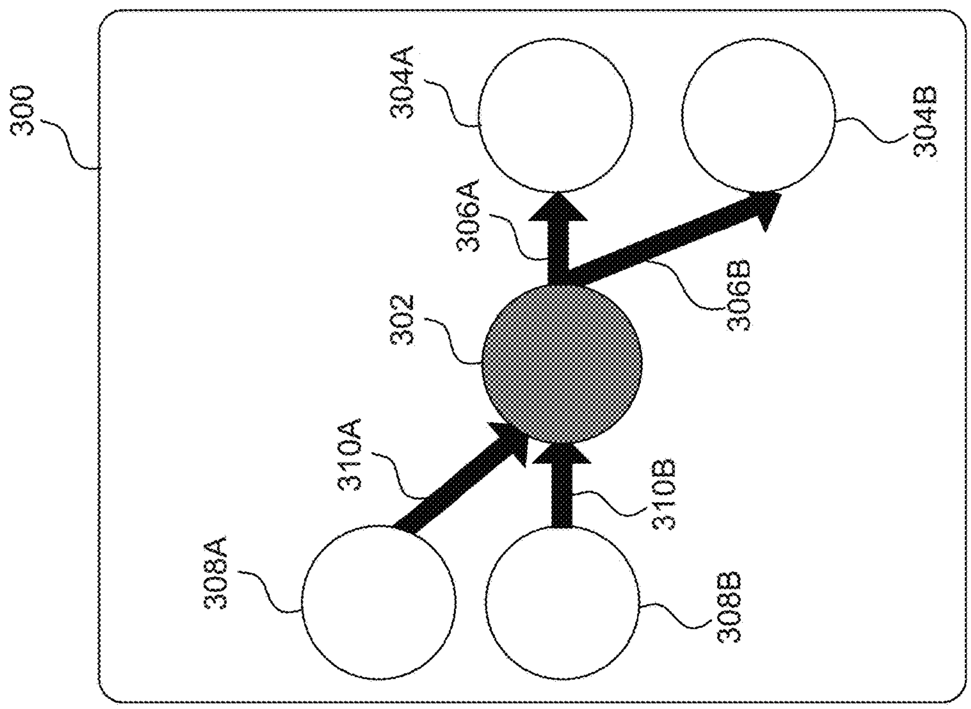
FIG. 3 is an example visible area of an exemplary integration scenario, according to some embodiments.

FIG. 3 is an exemplary illustration of visible area 300, according to some embodiments. Visible area 300 in FIG. 3 represents limited area 202, described in FIG. 2. However, visible area 300 is merely exemplary, and one skilled in the relevant art(s) will appreciate that many approaches may be taken to provide a suitable visible area 300 in accordance with this disclosure. Visible area 300 may include focus node 302, successor 304, forward connections 306, predecessors 308, and backward connections 310.

Focus node 302 may be a node, described above as node 204, of primary focus within an integration scenario being examined by user 102 in integration application design tool 110. As described above with reference to FIG. 2, integration scenario 200 may include more than one object or node. In some examples, integration scenario 200 may contain dozens, hundreds, thousands, or more nodes interacting in a myriad of ways. Focus node 302 provides a point of focus for user 102 on one of the nodes in particular in a given integration scenario 200. Integration application design tool 110 may provide interaction primitives that act upon focus node 302. In an embodiment, integration application design tool 110 may only load data and properties associated with focus node 302 in order to conserve system resources such as CPU and memory.

Successors 304 may be one or more nodes, such as are described above as node 204, that follow focus node 302 in integration scenario 200. In other words, in some embodiments, successors 304 occur after focus node 302 in a given integration scenario and receive data from focus node 302 or other successor of focus node 302. In a given integration scenario, successors 304 may be located at a determinable distance, i.e., a number of connections, from focus node 302. For example, if focus node 302 connected to a first successor, and the first successor connected to a second successor, the second successor would be a distance of two from focus node 302.

Forward connections 306 may be forward facing connections, i.e., a subset of connections from focus node 302 to successors 304. Forward connections 306 may harness pipelines, message channels, or other suitable connections to pass data between nodes. Forward connections 306 may include built in security capabilities that allow integration application design tool 110 to pass third-party applications data securely.

Predecessors 308 may be one or more nodes, such as are described above as node 204, that precede focus node 302 in integration scenario 200. In other words, predecessors 308 occur before focus node 302 in a given integration scenario and send data to focus node 302 or other predecessor of focus node 302. Similar to successors 304, predecessors 308 may also be located at a determinable distance, i.e. a number of connectors, from focus node 302.

Backward connections 310 may be backward facing connections, i.e., a subset of connections from focus node 302 to predecessors 308. Backward connections 310 may leverage pipelines, message channels, or other suitable connections to pass data between nodes.

Figure 4:
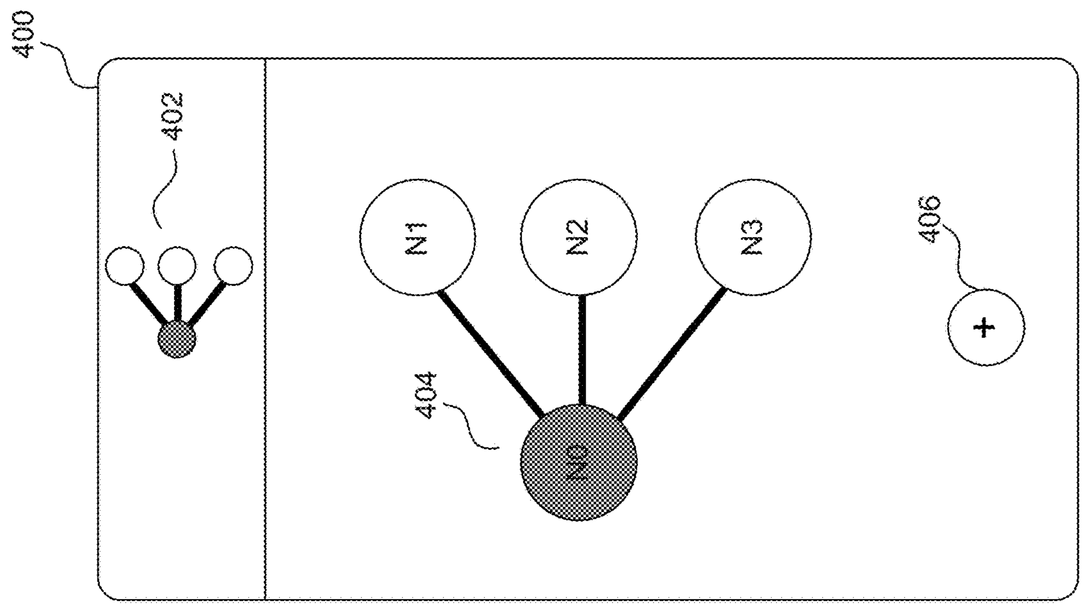
FIG. 4 is an example user interface displayed on a device, according to some embodiments.

FIG. 4 is an example user interface displayed on device 400, according to some embodiments. Device 400 is merely exemplary, and one skilled in the relevant art(s) will appreciate that many approaches may be taken to provide a suitable device 400 in accordance with this disclosure. Device 400 may include graph overview 402, visible area 404, and universal control 406.

Graph overview 402 may provide a comprehensive image or other representation of integration scenario 200. Graph overview 402 may highlight the portion of integration scenario 200 currently being viewed by user 102, i.e., visible area 300. Graph overview 402 may provide additional navigation capabilities allowing user 102 to jump or skip to other nodes in integration scenario 200. In some embodiments, graph overview 402 may be scaled or trimmed based on the size of the viewed integration scenario. Thus, graph overview 402 may provide only a portion of the integration scenario for large scenarios.

Selected area 404 may be provided by device 400 to provide the base process model mapping to the visualization techniques described herein. Selected area 404 may include nodes that are at a determined distance from focus node 302. The distance may be calculated using a "k+l" method, where "k" is a constant representing the distance from focus node 302 to include in selected area 404. This "k" constant may be referred to as the neighborhood value. In some embodiments, the neighborhood value may be determined programmatically based on a screen size of device 400. In this embodiment, larger screen sizes may use a larger neighborhood value, while smaller screens may use a neighborhood value of one (i.e., just one level of successors and one level of predecessors would be viewed).

Universal control 406 may denote a starting point for some interaction primitives, as described below with reference to FIGS. 5A-5H. In an embodiment, user 102 may swipe universal control 406 to signal an appropriate interaction primitive. In alternate embodiments, user 102 may click, gesture, or otherwise interact with universal control 406 in order to commence an interaction primitive.

FIGS. 5A-5H are example interaction primitives, according to some embodiments. Interaction primitives may be interpreted by event stream handler 114 in order to conduct actions in the course of reviewing and/or designing integration scenario 200.

Figure 5A:
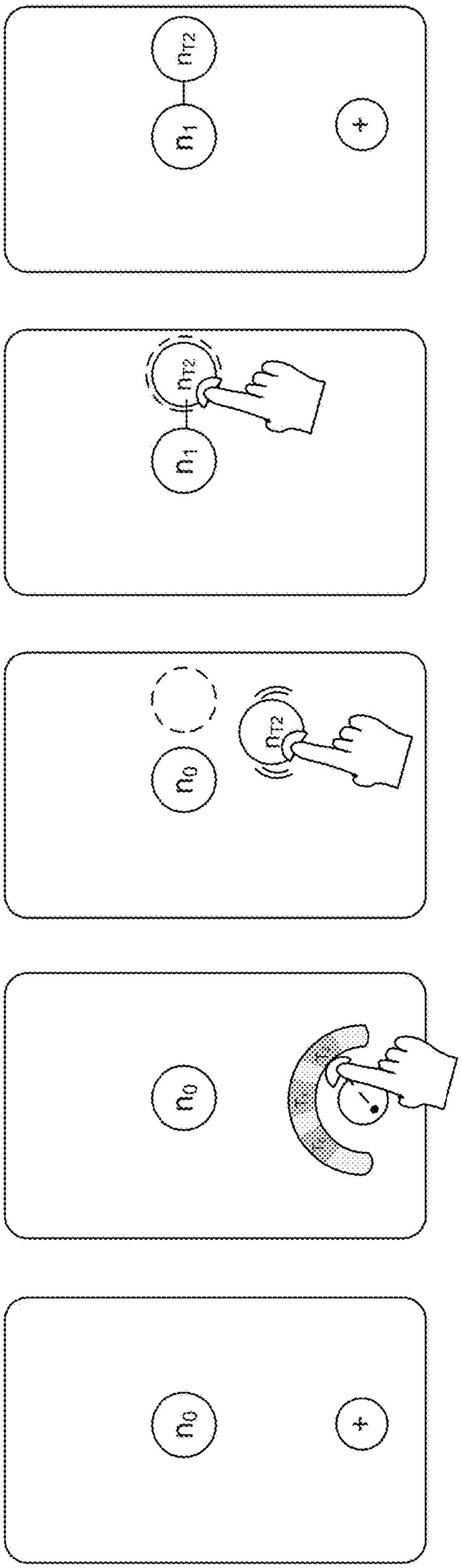
FIGS. 5A-5H are example screen displays demonstrating a variety of interaction primitives, according to some embodiments.

In FIG. 5A, an example of an interaction primitive is displayed that depicts the addition of a node, such as node 204, in an integration scenario, such as integration scenario 200. In this exemplary example, to add a node as a successor of the node labeled "n0", user 102 may tap and swipe upward on universal control 406 to open a circular set of node types or variants. User 102 may then select a particular node type by swiping the selection. User 102 may then drag and move the selected node. While dragging, a landing zone may appear to which the selected node may be moved and placed. Integration application design tool 110 may add the new node as a successor 304 when the user swipes right or, if the user swipes left, integration application design tool 110 may add a predecessor of focus node 302.

Figure 5B:
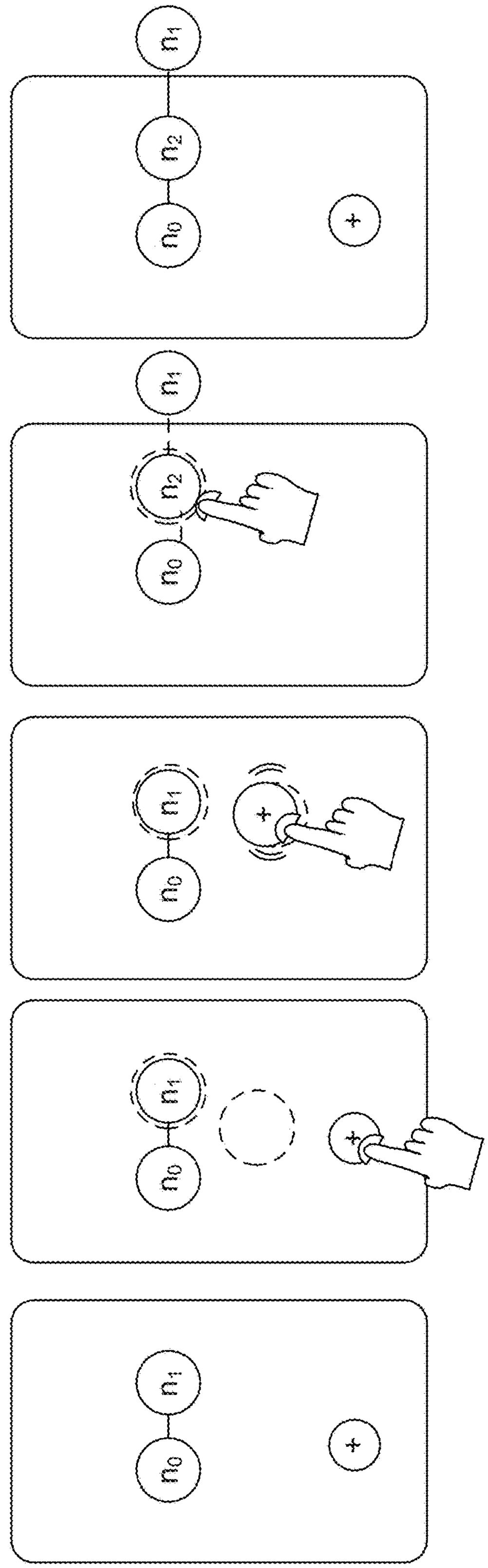

In FIG. 5B, an example of an interaction primitive is displayed that depicts the addition of a node, such as node 204, in an integration scenario, such as integration scenario 200 between focus node 204 and a successor in successors 304. In this exemplary example, to add a node as a successor of the node labeled "n0" and a predecessor of "n1", user 102 may tap and drag universal control 406 to between "n0" and "n1". Integration application design tool 110 may add the new node in the appropriate location, store any need updates in data 118, and add new or update existing connections as needed.

Figure 5C:
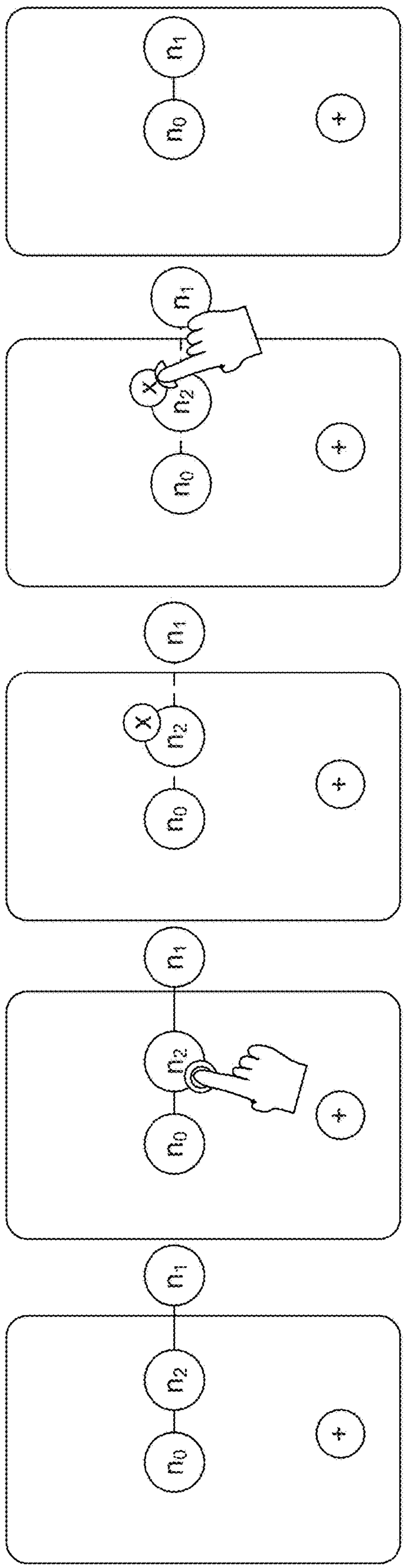

In FIG. 5C, an example of an interaction primitive is displayed that depicts the deletion of a node, such as node 204, in an integration scenario, such as integration scenario 200. In this exemplary example, user 102 may conduct a long press on the node to be deleted. Integration application design tool 110 may subsequently add a small delete icon at the boundary of the node. When user 102 taps on the small delete icon, the node (here labeled "n2") may be deleted. Integration application design tool 110 may delete the node from data 118 and update existing connections as appropriate.

Figure 5D:
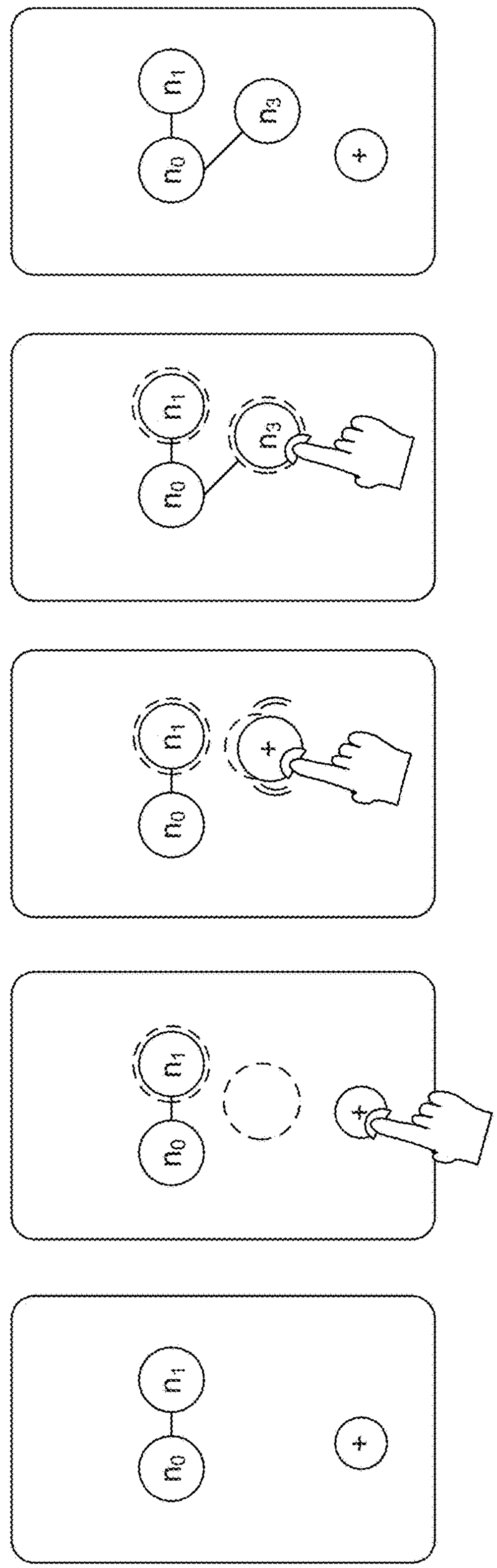

In FIG. 5D, an example of an interaction primitive is displayed that depicts the adding of multiple successors (fork) or predecessors (join) in integration scenario 200. In this exemplary example, to add a node as a successor of the node labeled "n0" in addition to successor "n1", user 102 may tap and swipe upward on universal control 406 to open the type selection and landing zone. User 102 may then select a particular node type by swiping the selection and may then drag and move the selected node to the landing zone. Integration application design tool 110 may add the new node as a successor 304 when the user swipes right or, if the user swipes left, integration application design tool 110 may add a predecessor of focus node 302. Thus, the visual programming approach described here evokes a symmetry property.

Figure 5E:
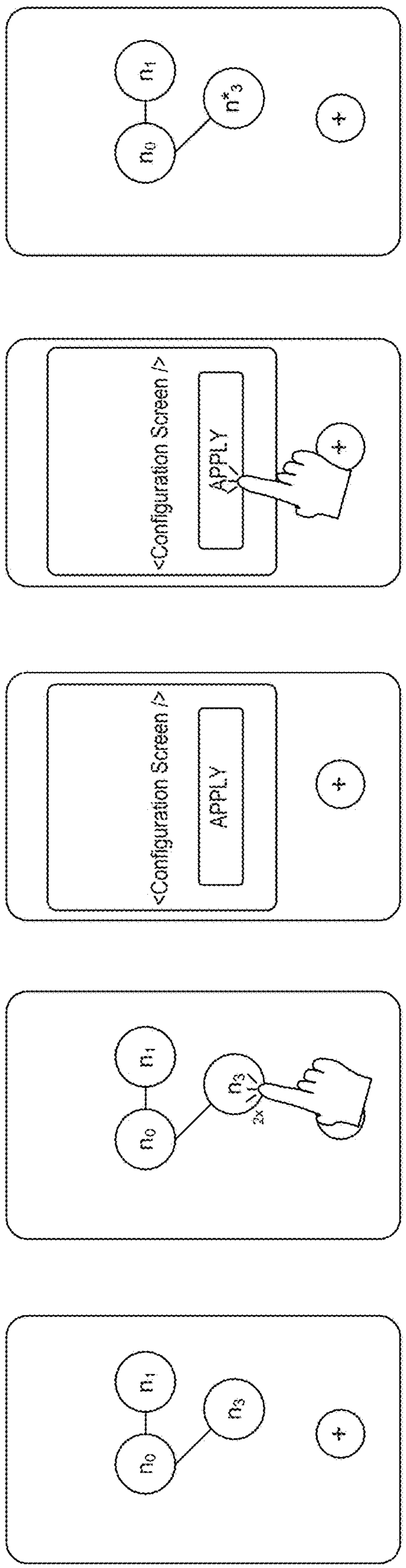

In FIG. 5E, an example of an interaction primitive is displayed that depicts the editing of properties or configurations for a node, such as node 204, in integration scenario 200. In this exemplary example, to edit settings for node 204 user 102 may double tap on node 204. Integration application design tool 110 may then open a configuration screen, which may be form-based, hierarchical, sub-menu, graph-based, or any other suitable design. Upon change, integration application design tool 110 may apply the configuration changes to node 204.

Figure 5F:
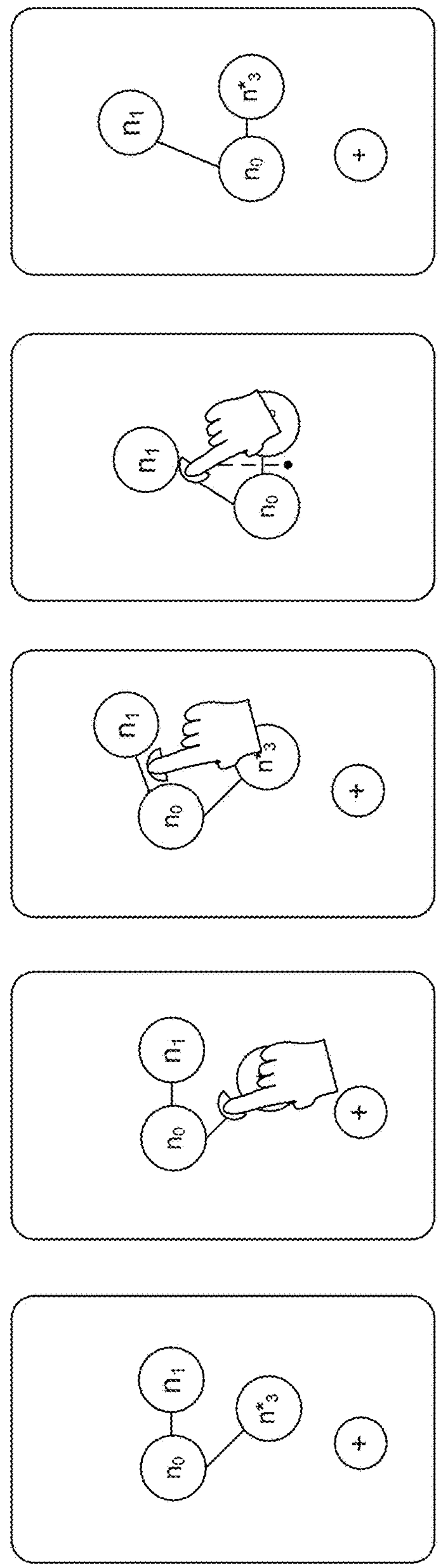

In FIG. 5F, an example of an interaction primitive is displayed that depicts a vertical traverse. In this exemplary example, user 102 may navigate through predecessors 308 or successors 304 in selected area 404. User 102 may complete a vertical swipe slightly to the left or right of focus node 302. When user 102 releases the swipe, one of the connections in the set may be placed on a horizontal axis with focus node 302. In such an embodiment, the horizontal axis lock may provide fast and exact navigation or traversal.

Figure 5G:
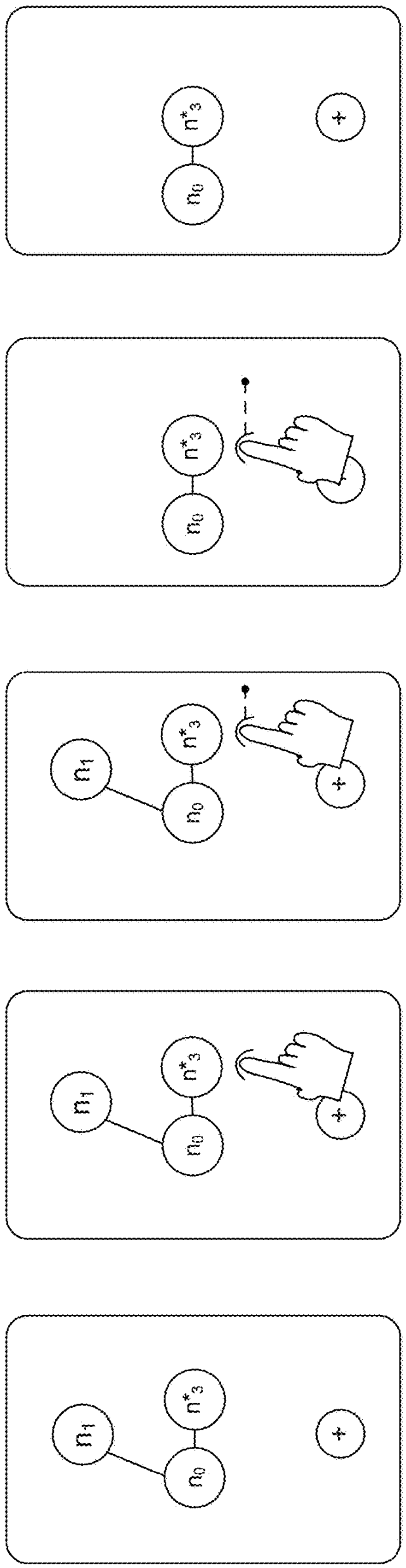

In FIG. 5G, an example of an interaction primitive is displayed that depicts a horizontal traverse. In this exemplary example, user 102 may navigate trace through predecessors 308 or successors 304 using a horizontal swipe. User 102 may perform such a swipe in open spaces in visible area 300. Unlike in the vertical traverse depicted in FIG. 5F, the horizontal swipe refocuses visible area 300 onto an updated focus node 302. Integration application design tool 110 may appropriately update successor nodes, predecessor nodes, forward connections, and backward connections based on the updated focus node 302. The horizontal traverse may only move along nodes, such as node 204, in a horizontally aligned axis. Thus, the combination of horizontal traverses with vertical traverses may be necessary to navigate through integration scenario 200.

Figure 5H:
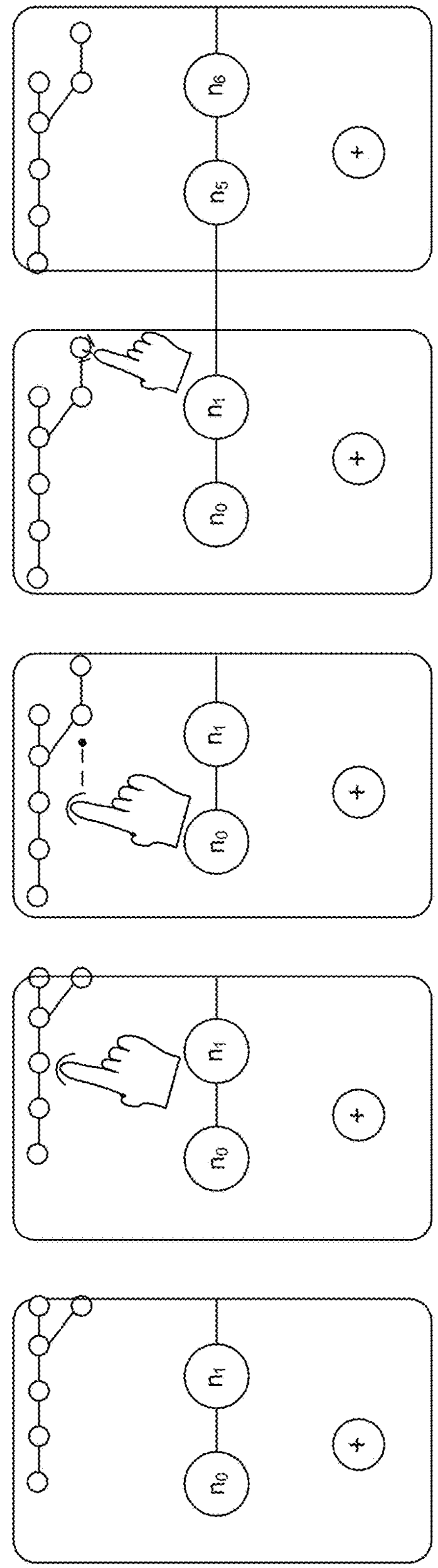

In FIG. 5H, an example of an interaction primitive is displayed depicting an interaction with graph overview 402. User 102 may navigate through graph overview 402 using a horizontal swipe or other suitable input gesture. In other words, user 102 may be able to jump to a different node 204 in integration scenario 200 thus updating focus node 302 to a different node through an alternate mechanism. Integration application design tool 110 may appropriately update successor nodes, predecessor nodes, forward connections, and backward connections based on the updated focus node 302 and render the updates in visible area 300 as appropriate.

By applying the interaction primitives described in FIGS. 5A-5H, integration application design tool 110 may provide a consistent user experience that supports complex integration scenarios while conserving system resources. This user experience makes designing integration applications on mobile devices possible.

Figure 6:
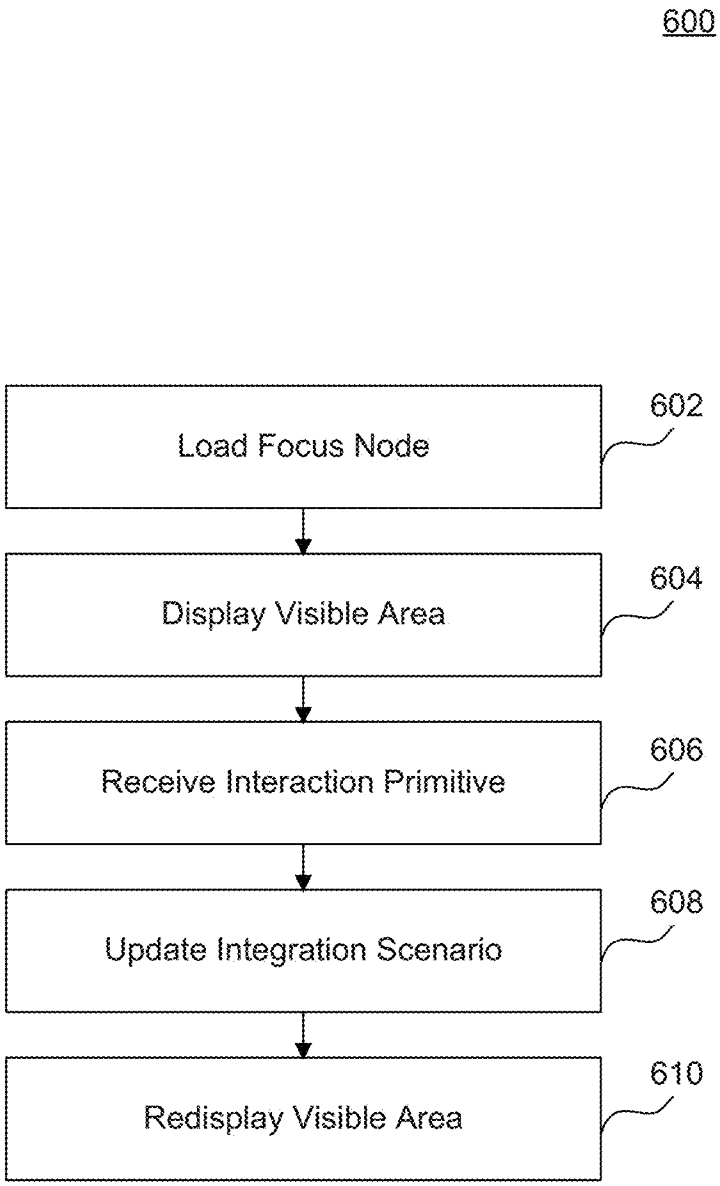
FIG. 6 is a flowchart illustrating a method of providing an integration application design tool supporting integration-scenario modeling on a mobile device, according to some embodiments.

FIG. 6 illustrates a method 600 of providing an integration application design tool that supports integration-scenario modeling on a mobile device, according to some embodiments. Method 600 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art(s).

In 602, integration application design tool 110 may load information about focus node 302. Such information may include properties about focus node 302, information about neighboring nodes including successors 304 and predecessors 308, information about connections between focus node 302 and neighboring nodes, i.e. forward connections 306 and backwards connections 310. In some embodiments, integration application design tool 110 may first determine a focus node among the nodes in integration scenario 200.

In 604, integration application design tool 110 may display a visible area, such as visible area 300, for an integration scenario 200. The visible area may be determined using a neighborhood value. The neighborhood value may be a "k+l" value that specifies a distance from focus node 302 to include in visible area 300. Integration application design tool 110 may present visible area 300 in a suitable interface on device 104. In one embodiment, user interface components 112 may center focus node 302 in visible are 300, or user interface components 112 may user color, shadow, text or other highlighting to evidence focus node 302 as node 204 being examined. Integration application design tool 110 may load graph overview 402, universal control 406, and other suitable user interface constructs to allow user 102 to interact with visible area 300. One such suitable interface is described above with reference to FIG. 4, however, this is merely exemplary, and one skilled in the arts will appreciate that such a user interface may take any number of suitable forms.

In 606, integration application design tool 110 may receive an interaction primitive from user 102 via device 104. Integration application design tool 110 may employ event stream handler 114 to interpret an interaction primitive or a series of interaction primitives. In one embodiment, interaction primitives that may be received may include: adding a node to an integration scenario, inserting a node as a successor or predecessor of focus node 302, deleting a node from an integration scenario, adding multiple successors (i.e. forking) or predecessors (i.e., joining), editing the properties of node, traversing vertically and/or horizontally, and interacting with a graph overview, such as graph overview 402. These interaction primitives are described in greater detail above with reference to FIGS. 5A-5H. Integration application design tool 110 may receive the interaction primitives as swipes using any suitable user input mechanism, e.g., using a finger, stylus, mouse, keyboard, or other suitable input device. In other embodiments, different gestures may be used including tapping, drawing, etc.

In 608, integration application design tool 110 may update the integration scenario based on the interaction primitive received in 506. Integration application design tool 110 may employ process engine 116 to interact with stored components of an integration scenario and/or interact with components via an API or other suitable method. Integration application design tool 110 may update information about the integration scenario being edited in data 118. Integration application design tool 110 may update focus node 302 to a different node in integration scenario 200. Integration application design tool 110 may appropriately update successor nodes, predecessor nodes, forward connections, and backward connections based on the updated focus node 302.

In 610, integration application design tool 110 may redisplay or re-render visible area 300 based on the interaction primitive received in 506. For example, integration application design tool 110 may add a node to integration scenario based the received interaction primitive. In this example, different successors 304 or predecessors 308 may display as well as updated forward connections 306 and backward connections 310. Integration application design tool 110 may re-render graph overview 402 if required.

Figure 7:
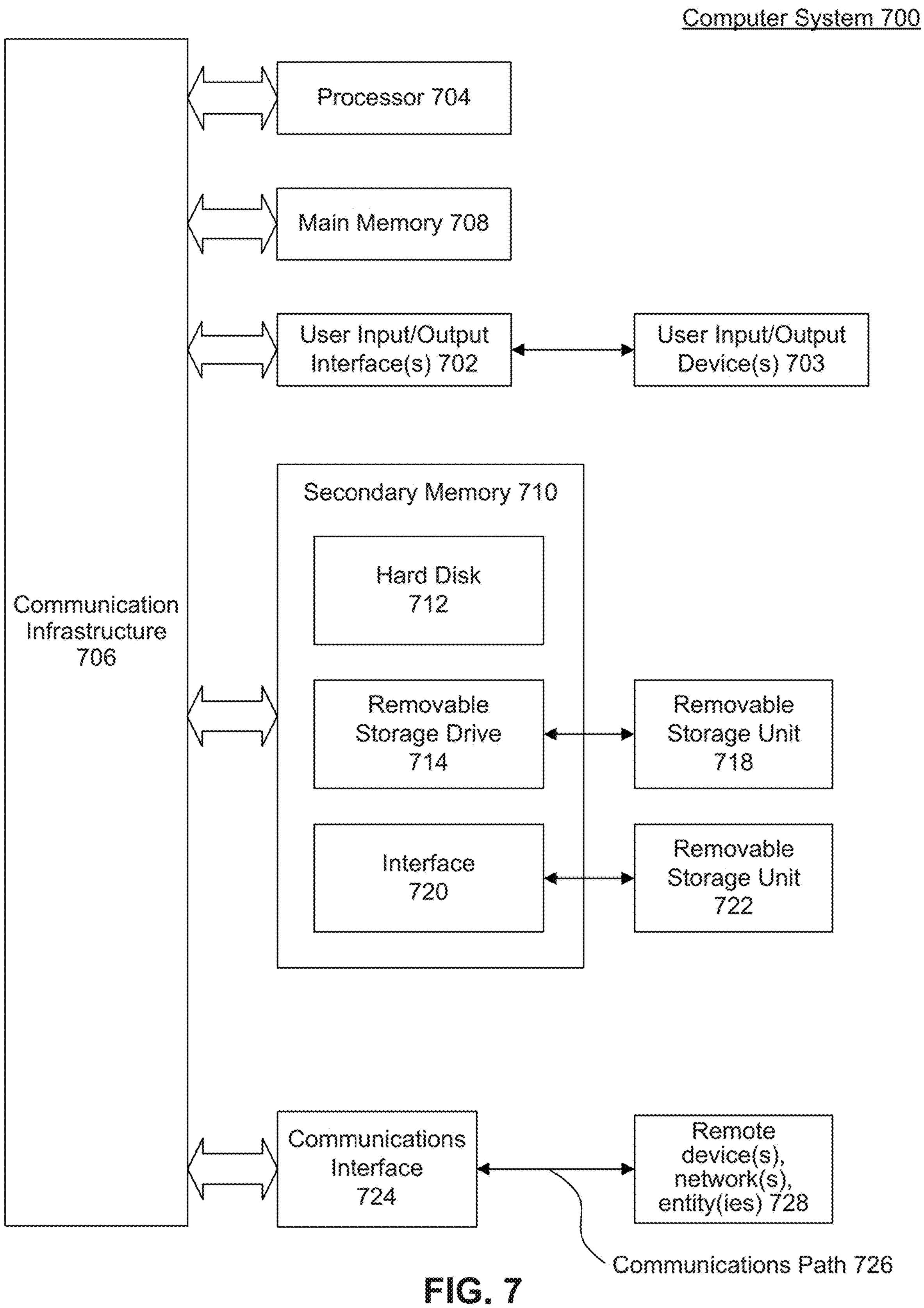
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 708, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:

determining, by an integration application design tool, a focus node from among one or more nodes in an integration scenario rendered in a user interface displayed on a device;

determining, by the integration application design tool, successor nodes, predecessor nodes, forward connections between the focus node and the successor nodes, and backward connections between the focus node and the predecessor nodes;

determining, by the integration application design tool, a visible area of the integration scenario based on a neighborhood value that displays the focus node, the successor nodes, the predecessor nodes, the forward connections, and the backward connections, wherein the neighborhood value is an integer value representing a distance from the focus node to include in the visible area;

displaying, by the integration application design tool, the visible area of the integration scenario in the user interface on the device;

receiving, by the integration application design tool, an interaction primitive in the user interface from the device; and updating, by the integration application design tool, the visible area based on the interaction primitive, wherein at least one of the determining, displaying, receiving, and updating are performed by one or more computers.

2. The method of claim 1, the updating further comprising:

when the interaction primitive is a traverse, updating, by the integration application design tool, the focus node to a different node from among the one or more nodes based on the interaction primitive;

updating, by the integration application design tool, the successor nodes, the predecessor nodes, the forward connections, and the backward connections based on the updated focus node;

determining, by the integration application design tool, a second visible area based on the neighborhood value and the updated focus node; and displaying, by the integration application design tool, the second visible area in the user interface on the device.

3. The method of claim 1, the updating further comprising:

when the interaction primitive is an add object indicator, inserting, by the integration application design tool, an additional node into the one or more nodes based on the interaction primitive;

updating, by the integration application design tool, the focus node to the additional node;

updating, by the integration application design tool, the successor nodes, the predecessor nodes, the forward connections, and the backward connections based on the updated focus node;

determining, by the integration application design tool, a second visible area based on the neighborhood value and the updated focus node; and displaying, by the integration application design tool, the second visible area in the user interface on the device.

4. The method of claim 1, the updating further comprising:

when the interaction primitive is a delete object indicator, removing, by the integration application design tool, the focus node from the one or more nodes based on the interaction primitive;

updating, by the integration application design tool, the focus node to a different node from among the one or more nodes;

determining, by the integration application design tool, a second visible area based on the neighborhood value and the updated focus node; and displaying, by the integration application design tool, the second visible area in the user interface on the device.

5. The method of claim 1, the updating further comprising:

when the interaction primitive is an edit indicator, loading, by the integration application design tool, an edit properties dialog;

retrieving, by the integration application design tool, properties associated with the focus node; and displaying, by the integration application design tool, the properties in the edit properties dialog.

6. The method of claim 1, further comprising:

displaying, by the integration application design tool, a graph overview area displaying the integration scenario in its entirety in association with the visible area.

7. The method of claim 1, further comprising:

determining, by the integration application design tool, the neighborhood value based on a screen size of the device.

8. A system, comprising:

a memory, and at least one processor coupled to the memory and configured to:

determine a focus node from among one or more nodes in an integration scenario rendered by an integration application design tool in a user interface displayed on a device;

determine successor nodes, predecessor nodes, forward connections between the focus node and the successor nodes, and backward connections between the focus node and the predecessor nodes;

determine a visible area of the integration scenario based on a neighborhood value that displays the focus node, the successor nodes, the predecessor nodes, the forward connections, and the backward connections, wherein the neighborhood value is an integer value representing a distance from the focus node to include in the visible area;

display the visible area of the integration scenario in the user interface on the device;

receive an interaction primitive in the user interface from the device; and update the visible area based on the interaction primitive.

9. The system of claim 8, wherein to update the visible area, the at least one processor is further configured to:

when the interaction primitive is a traverse, update the focus node to a different node from among the one or more nodes based on the interaction primitive;

update the successor nodes, the predecessor nodes, the forward connections, and the backward connections based on the updated focus node;

determine a second visible area based on the neighborhood value and the updated focus node; and display the second visible area in the user interface on the device.

10. The system of claim 8, wherein to update the visible area, the at least one processor is further configured to:

when the interaction primitive is an add object indicator, insert an additional node into the one or more nodes based on the interaction primitive;

update the focus node to the additional node;

update the successor nodes, the predecessor nodes, the forward connections, and the backward connections based on the updated focus node;

determine a second visible area based on the neighborhood value and the updated focus node; and display the second visible area in the user interface on the device.

11. The system of claim 8, wherein to update the visible area, the at least one processor is further configured to:

when the interaction primitive is a delete object indicator, remove the focus node from the one or more nodes based on the interaction primitive;

update the focus node to a different node from among the one or more nodes;

determine a second visible area based on the neighborhood value and the updated focus node; and display the second visible area in the user interface on the device.

12. The system of claim 8, wherein to update the visible area, the at least one processor is further configured to:

when the interaction primitive is an edit indicator, load an edit properties dialog;

retrieve properties associated with the focus node; and display the properties in the edit properties dialog.

13. The system of claim 8, the at least one processor further configured to:

display a graph overview area displaying the integration scenario in its entirety in association with the visible area.

14. The system of claim 8, the at least one processor further configured to:

determine the neighborhood value based on a screen size of the device.

15. A non-transitory computer-readable device having instructions stored thereon that, when executed by at least one computing device, cause the at least one computing device to perform operations comprising:

determining a focus node from among one or more nodes in an integration scenario rendered by an integration application design tool in a user interface displayed on a device;

determining successor nodes, predecessor nodes, forward connections between the focus node and the successor nodes, and backward connections between the focus node and the predecessor nodes;

determining a visible area of the integration scenario based on a neighborhood value that displays the focus node, the successor nodes, the predecessor nodes, the forward connections, and the backward connections, wherein the neighborhood value is an integer value representing a distance from the focus node to include in the visible area;

displaying the visible area of the integration scenario in the user interface on the device;

receiving an interaction primitive in the user interface from the device; and updating the visible area based on the interaction primitive.

16. The non-transitory computer-readable device of claim 15, the updating comprising:

when the interaction primitive is a traverse, updating the focus node to a different node from among the one or more nodes based on the interaction primitive;

updating the successor nodes, the predecessor nodes, the forward connections, and the backward connections based on the updated focus node;

determining a second visible area based on the neighborhood value and the updated focus node; and displaying the second visible area in the user interface on the device.

17. The non-transitory computer-readable device of claim 15, the updating comprising:

when the interaction primitive is an add object indicator, inserting an additional node into the one or more nodes based on the interaction primitive;

updating the focus node to the additional node;

updating the successor nodes, the predecessor nodes, the forward connections, and the backward connections based on the updated focus node;

determining a second visible area based on the neighborhood value and the updated focus node; and displaying the second visible area in the user interface on the device.

18. The non-transitory computer-readable device of claim 15, the updating comprising:

when the interaction primitive is a delete object indicator, removing the focus node from the one or more nodes based on the interaction primitive;

updating the focus node to a different node from among the one or more nodes;

determining a second visible area based on the neighborhood value and the updated focus node; and displaying the second visible area in the user interface on the device.

19. The non-transitory computer-readable device of claim 15, the updating comprising:

when the interaction primitive is an edit indicator, loading an edit properties dialog;

retrieving properties associated with the focus node; and displaying the properties in the edit properties dialog.

20. The non-transitory computer-readable device of claim 15, the operations further comprising:

displaying a graph overview area displaying the integration scenario in its entirety in association with the visible area.

* * * * *